April 25, 1933.  F. VOELKER, JR  1,905,018
MATERIAL MEASURING AND HANDLING APPARATUS
Filed Sept. 18, 1929  3 Sheets-Sheet 1
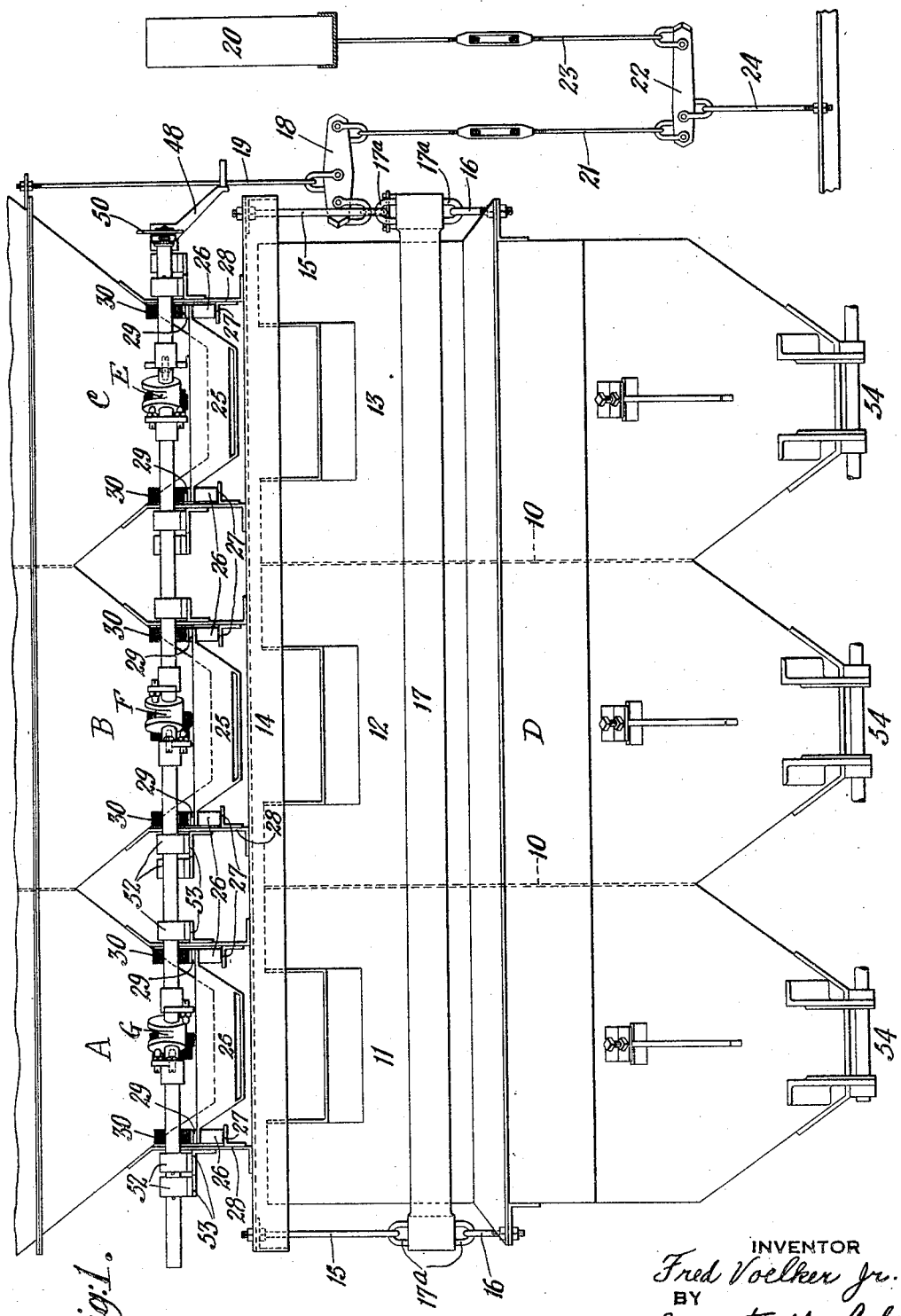
INVENTOR
Fred Voelker Jr.
BY
Synnestvedt & Lechner
ATTORNEYS April 25, 1933.    F. VOELKER, JR    1,905,018
MATERIAL MEASURING AND HANDLING APPARATUS
Filed Sept. 18, 1929    3 Sheets-Sheet 2
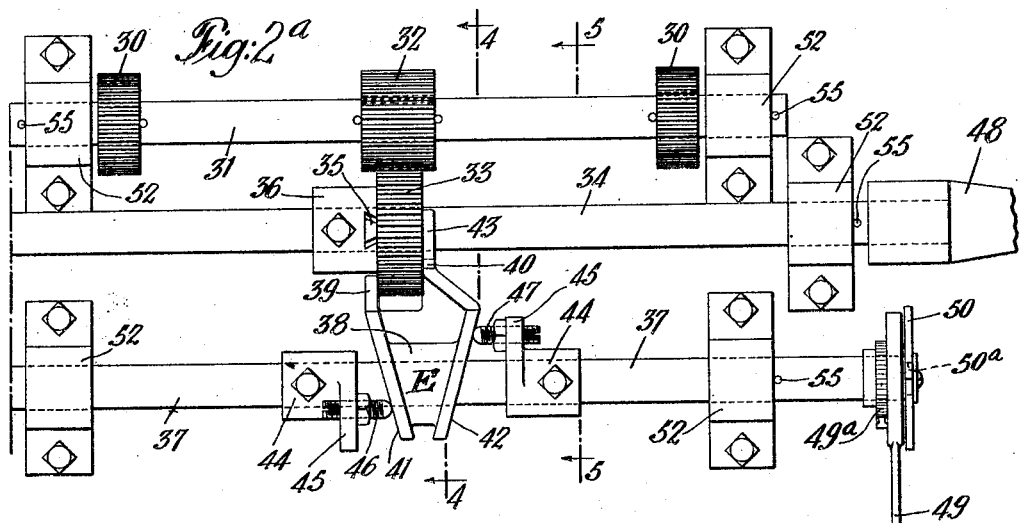
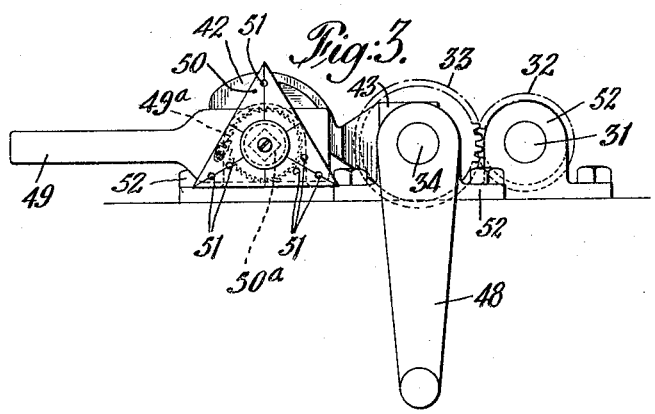
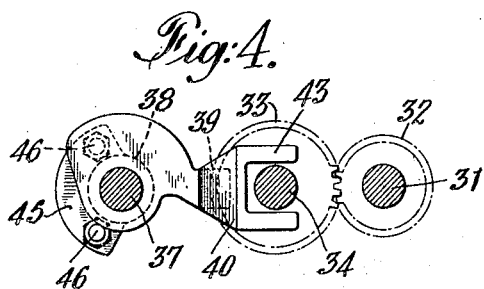
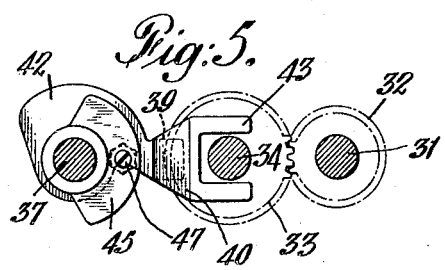
INVENTOR
Fred Voelker Jr
BY
Synnestvedt & Lechner
ATTORNEYS April 25, 1933. F. VOELKER, JR 1,905,018
MATERIAL MEASURING AND HANDLING APPARATUS
Filed Sept. 18, 1929 3 Sheets-Sheet 3
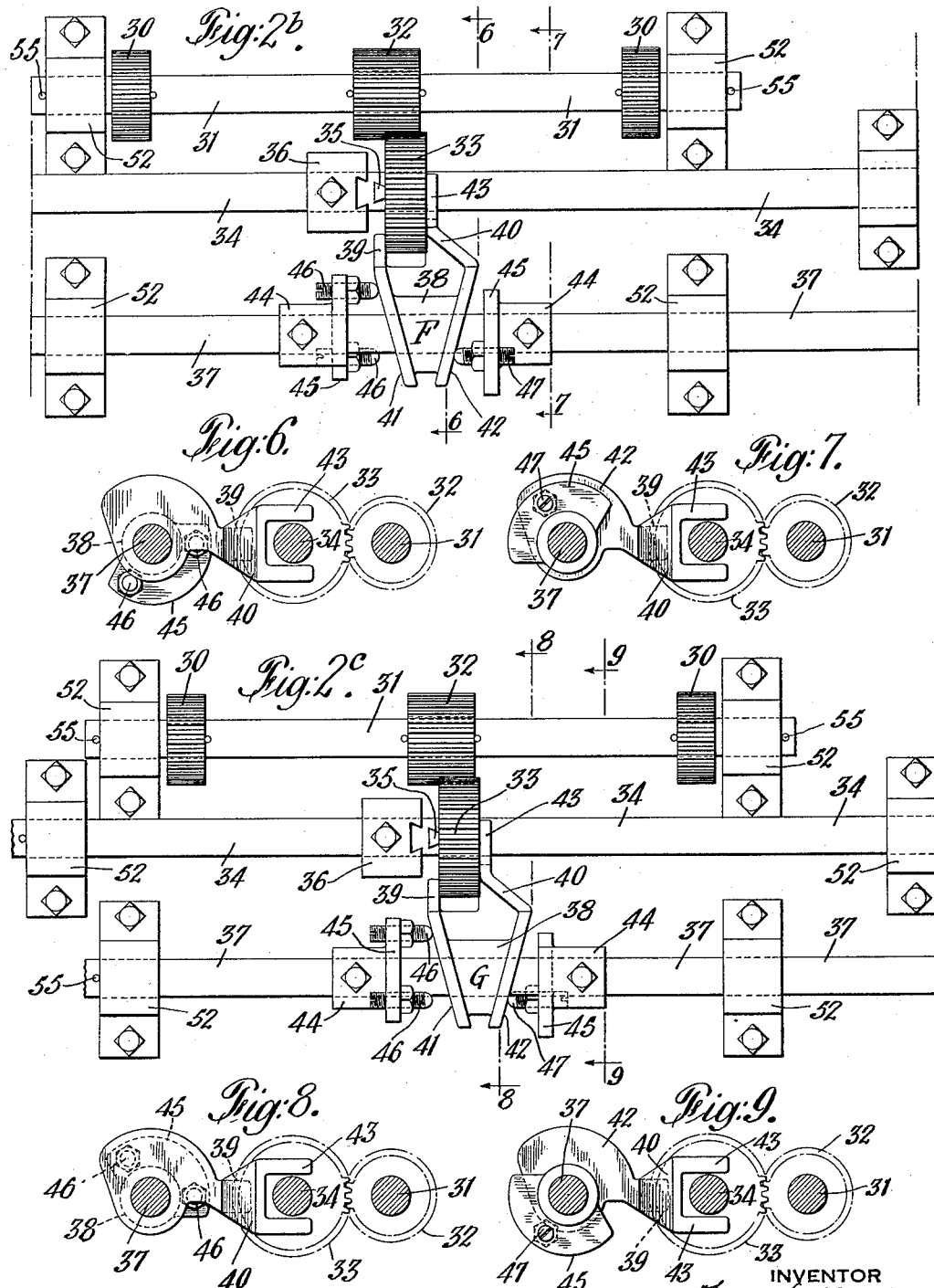
INVENTOR
Fred Voelker Jr
BY
Lynnestvedt & Lechner
ATTORNEYS Patented Apr. 25, 1933

1,905,018

UNITED STATES PATENT OFFICE

FRED VOELKER, JR., OF PITTSBURGH, PENNSYLVANIA, ASSIGNOR TO BLAW-KNOX COMPANY, OF PITTSBURGH, PENNSYLVANIA, A CORPORATION OF NEW JERSEY

MATERIAL MEASURING AND HANDLING APPARATUS

Application filed September 18, 1929. Serial No. 393,393.

This invention relates to material measuring and handling apparatus, as, for instance, batchers or apparatus for the measuring and handling of aggregates, such as sand, stone and cement, used in the manufacture of concrete, and is particularly concerned with the control mechanism for the feeding of the materials.

One of the primary objects of the invention is the simplification of the construction, assemblage and operation of apparatus of this type.

Another object of the invention is the provision of an apparatus of the type specified which may be controlled by one operator stationed at one side without moving from this position either to operate the material delivery means or to effect adjustments necessary for measuring the materials being used, either by volume or by weight.

The foregoing objects and advantages will appear more clearly from a consideration of the following description taken in connection with the accompanying drawings, which illustrate the preferred embodiment of the apparatus and in which Figure 1 is a side elevational view of the apparatus and associated bins and hoppers, certain of the parts being omitted for the sake of clarity;

Figures 2a, 2b and 2c, when placed end to end, illustrate the controlling or operating mechanism of the present invention in plan;

Figure 3 is an elevational view taken at the right-hand end of Figure 2a;

Figures 4 and 5 are sectional views taken, respectively, as indicated by the lines 4—4 and 5—5 of Figure 2a;

Figures 6 and 7 are sectional views similar to Figs. 4 and 5 but taken as indicated by the lines 6—6 and 7—7 of Figure 2b; and Figures 8 and 9, in like manner, are taken as indicated by the lines 8—8 and 9—9 of Figure 2c.

Referring now more particularly to Figure 1, it will be seen that I have therein illustrated a row of bins, discharge throats of which are indicated at A, B and C. Below each of the throats is arranged a weighing or measuring hopper device indicated in general by the reference character D and subdivided by the walls 10 into separate compartments 11, 12 and 13 positioned, respectively, below the bin throats A, B and C. At this point it might be noted that the bins and/or the hoppers may be made either entirely separately or integrally, as indicated in the drawings.

The hoppers 11, 12 and 13 may be rigidly supported from the framework 14 or, as indicated in the drawings, may be suitably associated with a weighing mechanism, the said mechanism including links 15 and 16 which support the hoppers from the framework 14 through the interposed lever mechanism which includes longitudinal beams 17 and transverse levers (not shown) to the latter of which the links are secured by the U-members 17a. The weighing mechanism proper is coupled with the lever mechanism at one end of the hopper construction D as indicated at the right of Figure 1, and, briefly, includes a lever 18 the fulcrum point of which is supported by the rod or link 19. One end of the lever 18 is suitably coupled with the lever mechanism while the other end is associated with the scale diagrammatically indicated at 20 through link 21, lever 22 and link 23, the fulcrum of the lever 22 being supported from any suitable stationary point by the connection 24. In this connection, it is to be noted that the weighing mechanism forms no part of the present invention per se and hence is only briefly described herein. A more detailed disclosure of a weighing mechanism suitable for the purpose may be had, if desired, by inspection of the copending application of Martin and Voelker, Jr., Serial No. 305,718, filed September 13, 1928.

At the bottom or discharge point of each one of the bin throats A, B and C is arranged a discharge control gate 25, the same being mounted on rollers 26 which ride on the tracks 27, the said tracks being suitably supported on the structure 14 by means of the upright plates 28. The gates, therefore, move in a horizontal plane transversely of the bin and hopper mechanism.

In order to operate the gates, I have provided racks 29 at the sides of each gate extending below and meshing with the gears 30, it being noted that two gears 30 and racks 29 are provided for each of the gates and also that the two gears 30 for each gate are mounted on a shaft 31 (see Figs. 2a, 2b and 2c). The construction so far described is similar in many respects to the gate construction and associated parts illustrated in the copending application above referred to, and forms no part of the present invention per se, although a showing thereof is included in this disclosure in order that the operation of the operating mechanism now to be described may be more clearly understood.

The operating mechanism of the present invention includes a gear 32 mounted on each of the shafts 31 at a point intermediate of gears 30 and a gear 33 meshing therewith and mounted on a common shaft 34 which extends throughout the entire length of the bins and hoppers employed in the particular installation, it being understood that the invention is applicable to constructions wherein any number of bins and hoppers are employed although only three are illustrated in the drawings. From inspection of the drawings, particularly Figures 2a, 2b and 2c, it will be apparent that the shaft 34 is arranged in parallelism with the shafts 31 and also that the gears 33 are free to revolve as well as slide longitudinally on the shaft 34. Each one of the gears 33 is provided with projections 35, preferably of dovetail configuration, which are engaged by and cooperate with the members 36, the latter being rigidly secured to the shaft 34 so that the gears 33 and the members 36, in effect, constitute male and female elements of clutching devices.

The invention further includes a cam mechanism for actuating the several clutching devices to which end another shaft 37 extending throughout the entire length of the structure is provided. The cam mechanism proper includes dogs or members 38 having prongs or extensions 39 and 40 for engaging the gears 33 at the sides thereof, the said dogs being mounted for sliding movement along the shaft 37 and being provided with cam surfaces 41 and 42 on each side. It should also be noted that the prong 40 of each of the dogs has a bifurcated end portion 43 adapted to engage the shaft 34 in order to prevent them from rotating on the shaft 37.

Rigidly mounted on the shaft 37 at either side of each one of the dogs 38 are collars 44 having semi-flanges 45, the latter being provided for the purpose of supporting the adjusting bolts or screws 46 and 47 which cooperate with the cam surfaces 41 and 42 to effect movement of the dog members and thus of the gears 33 longitudinally of their respective shafts 37 and 34.

For the purpose of clarity in the following statement of operation the three clutching devices including their gears 33, members 36 and dogs 38 are designated, in general, by the reference characters E, F and G.

At one end of the operating and controlling mechanism the shaft 34 is provided with a crank handle 48 and the shaft 37 is provided with an operating lever 49. In order to afford an indication of the position of the various clutching devices controlled by the lever 49, I have arranged an indicating member 50 in the form of a triangular plate secured as against rotation to the shaft 37 adjacent the lever 49. This indicator may be provided with any suitable inscription or legend for advising the operator of the position of the entire clutching mechanism or, as indicated in Figure 3, may be provided with suitable markings such as the holes 51 at each corner for the same purpose. It is to be understood, of course, that where an installation is being made in which a different number of bins is employed, the indicator may take some other suitable form or be provided with any other suitable marking or inscription.

It might also be noted that all of the shafts 31, 34 and 37 are mounted in suitable bearings 52 supported on any convenient structure, such, for example, as the angle members 53 (see Fig. 1) and that endwise movement of the various shafts is prevented by any suitable means such as the pins 55. The operating handle 48 and lever 49 are preferably positioned at the end of the installation which is adjacent to the scale mechanism, but it should be understood that the gate controlling members as well as the weighing mechanism may be mounted at either end of the entire construction according to particular needs or circumstances which may arise.

At the bottom of the hopper construction D are arranged outlets for each of the compartments thereof with suitable gates or dumping devices indicated at 54.

In general, it will be seen: that my invention provides for the ready operation and control of the entire batcher from a point on one side thereof, including the operations of delivering materials such as sand, cement, large stone, small stone, or any combinations thereof to the hopper, measuring and/or weighing them, reading or adjusting the scales and discharging the measured materials; that the construction provides for the ready assemblage and shipment of the whole structure including bins and hoppers, as a unit; that the device is so constructed as to permit of the transfer of the several controls, or certain ones only, at will, to the other side of the hopper and bin construction, after the mechanism is set up at the scene of operations; and that the device may be used, in its entirety, for measurement by volume only, by weight only, or by both volume and weight.

By referring now more particularly to Figures 2a, 2b, 2c and 3 to 9, inclusive, it will be seen that when the construction is set up for operation the collars 44 are so set circumferentially of the shaft 37 and the bolts 47 are so adjusted that an engagement or entrainment of only one of the clutch devices is maintained for a given setting of the lever 49 and indicator 50. As shown in Figures 2a, 3, 4 and 5, with the adjustment of the parts 44 and 47 indicated, the clutch device E occupies the engaged position with the lever 49 at the setting indicated. The other clutch devices F and G, as indicated in Figs. 2b and 2c are then in disengaged position. The parts associated with the clutching devices F and G are so arranged and adjusted with respect to those associated with the device E that upon movement of the lever 49 upwardly through 120 degrees (in which position another corner of the triangular indicator will appear at the top) the clutching device F will change to the engaged position, while the clutch E will be disengaged. In like manner when the lever 49 is moved to bring the third corner of the triangular indicator to the top, the clutching device G will become engaged and the clutching devices F and E will occupy the disengaged positions.

The engagement and disengagement of each one of the clutching devices is, of course, effected by means of the adjustable bolts 46 and 47 bearing on the cam surfaces 41 and 42, respectively, and, as will be apparent from inspection of Figures 2a, 4 and 5, two bolts 46 are provided at the left of the clutching device E, while only one bolt 47 is provided at the right, the two bolts 46 serving to maintain the associated clutching device in disengaged position during rotation of the shaft 37 to effect engagement of the devices F and G.

It should be noted still further that the effective cam surfaces of each one of the dogs 38 extend throughout only approximately 120 degrees about the shaft 37 and that the movement of the shaft 37 is always effected clockwise when viewed as in Figure 3. In order to effect this movement and avoid interference of the lever 49 with the shaft 34 or the crank 48, a pawl or ratchet mechanism indicated at 49a is preferably employed at the point of attachment of the lever 49 to the shaft 37, it being understood that the indicator 50 is rigid with the shaft by means of the squared stud 50a thereof on which it is mounted.

In connection with the cam surfaces and the correlative movement of the bolts 46 and 47, it should be noted that upon rotation of the shaft 37, as specified, the bolts ride on the cam surfaces from their lowest to their highest points at the latter of which the cam surfaces terminate. Thus, with the lever 49 in the position indicated, a movement of the lever upwardly causes the bolt 47 of the clutch device E (see Figs. 2a, 4 and 5) to ride off of the high point of the cam surface 42 and also causes one of the bolts 46 to engage the cam surface 41 near the low point thereof to ride thereon and effect a movement of this device to cause disengagement. Further, a movement of the lever 49 upwardly from the position indicated brings both bolts 46 of the clutching device F out of engagement with the cam surface 41 and at the same time causes the bolt 47 of this device to ride on the cam surface 42 toward its high point and thus effect a movement of the dog 38 to the left (see Figs. 2b, 6 and 7). In like manner, an additional movement of the shaft 37 through 120 degrees causes a disengagement of the clutching device F and an engagement of the clutching device G, as will be aparent from inspection of Figures 2c, 8 and 9.

From the foregoing, it will be apparent that the present invention makes provision for simple and convenient control of a series of bins in apparatus of this type irrespective of the particular number employed and that the whole construction is of a type which is readily assembled and operated at the scene of operations.

In addition, ready adjustment is had for all parts, such as the clutch members, the cam-engaging screws, and the screw-supporting collars.

I claim:

In material measuring and handling apparatus, the combination of a material supply device, a discharge control means for the device including a gear, operating means for the control means including a shaft, a gear mounted for rotative and sliding movement on said shaft and clutch means for coupling and uncoupling the second mentioned gear and the shaft without disengaging the intermeshing gears.

In testimony whereof I have hereunto signed my name.

FRED VOELKER, Jr.